(12) United States Patent
Berliner et al.

(10) Patent No.: US 11,575,910 B2
(45) Date of Patent: Feb. 7, 2023

(54) VIDEO AWARE TRANSMISSION AND MULTIPLE INPUT MULTIPLE OUTPUT LAYER PROCESSING

(71) Applicant: QUALCOMM Incorporated, San Diego, CA (US)

(72) Inventors: Ran Berliner, Kfar-Aviv (IL); Assaf Touboul, Netanya (IL); Shay Landis, Hod Hasharon (IL); Yehonatan Dallal, Kfar Saba (IL); Roman Budilovsky, Lod (IL); Michael Levitsky, Rehovot (IL); Albert Yosher, Tel Mond (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/249,929

(22) Filed: Mar. 18, 2021

(65) Prior Publication Data

US 2021/0321115 A1    Oct. 14, 2021

Related U.S. Application Data

(60) Provisional application No. 63/007,717, filed on Apr. 9, 2020.

(51) Int. Cl.
*H04N 19/159* (2014.01)
*H04L 12/851* (2013.01)
(Continued)

(52) U.S. Cl.
CPC ......... *H04N 19/159* (2014.11); *H04B 17/336* (2015.01); *H04L 47/2441* (2013.01); *H04L 69/22* (2013.01)

(58) Field of Classification Search
None
See application file for complete search history.

(56) References Cited

U.S. PATENT DOCUMENTS

| | | |
|---|---|---|
| 11,245,741 B2 | 2/2022 | Berliner et al. |
| 11,356,374 B2 | 6/2022 | Bevilacqua et al. |

(Continued)

FOREIGN PATENT DOCUMENTS

WO    WO-2018121840 A1    7/2018

OTHER PUBLICATIONS

International Search Report and Written Opinion—PCT/US2021/026018—ISA/EPO—dated Jul. 20, 2021.
(Continued)

*Primary Examiner* — Mohammad J Rahman
(74) *Attorney, Agent, or Firm* — Harrity & Harrity LLP

(57) ABSTRACT

Various aspects of the present disclosure generally relate to wireless communication. In some aspects, a communication device may classify a set of packets of streaming video content based at least in part on one or more video characteristics; assign the set of packets to a plurality of transport blocks based at least in part on classifying the set of packets, wherein a first transport block is associated with a first set of values for a set of communication parameters and a second transport block is associated with a second set of values for the set of communication parameters, and wherein the set of communication parameters is associated with a layer mapping technique; and provide the plurality of transport blocks for transmission based at least in part on assigning the set of packets to the plurality of transport blocks. Numerous other aspects are provided.

22 Claims, 10 Drawing Sheets

(51) Int. Cl.
  *H04L 29/06* (2006.01)
  *H04B 17/336* (2015.01)
  *H04L 69/22* (2022.01)
  *H04L 47/2441* (2022.01)

(56) References Cited

U.S. PATENT DOCUMENTS

| | | | |
|---|---|---|---|
| 2004/0203657 A1* | 10/2004 | Koskelainen | H04Q 11/0478 455/414.1 |
| 2008/0177884 A1* | 7/2008 | Agarwal | H04L 1/1841 709/227 |
| 2010/0142616 A1* | 6/2010 | Hegde | H04N 19/156 375/E7.126 |
| 2012/0155398 A1 | 6/2012 | Oyman et al. | |
| 2012/0307751 A1 | 12/2012 | Dinan | |
| 2014/0082146 A1* | 3/2014 | Bao | H04L 43/0882 709/219 |
| 2014/0233420 A1* | 8/2014 | Honda | H04L 43/06 370/252 |
| 2015/0138373 A1* | 5/2015 | Garcia | H04N 19/154 348/192 |
| 2016/0100230 A1 | 4/2016 | Ma et al. | |
| 2016/0142935 A1 | 5/2016 | Oettl et al. | |
| 2016/0219088 A1 | 7/2016 | Ma et al. | |
| 2017/0364794 A1* | 12/2017 | Mahkonen | H04L 63/0428 |
| 2019/0223194 A1* | 7/2019 | Arrobo Vidal | H04L 65/80 |
| 2019/0394527 A1* | 12/2019 | Chandrasekhar | H04N 21/4621 |
| 2020/0099990 A1 | 3/2020 | Boggia et al. | |
| 2020/0163052 A1 | 5/2020 | Ko et al. | |
| 2020/0204312 A1 | 6/2020 | Xu et al. | |
| 2020/0296011 A1 | 9/2020 | Jain et al. | |
| 2020/0322694 A1* | 10/2020 | Colligan | H04N 21/64784 |
| 2021/0321145 A1 | 10/2021 | Berliner et al. | |
| 2021/0321286 A1 | 10/2021 | Berliner et al. | |

OTHER PUBLICATIONS

Munaretto D., et al., "Broadcast Video Streaming in Cellular Networks: An Adaptation Framework for Channel, Video and AL-FEC Rates Allocation", Wireless Internet Conference (WICON), 2010 The 5th Annual ICST, IEEE, Piscataway, NJ, USA, Mar. 2, 2010 (Mar. 2, 2010), pp. 1-9, XP031661437, paragraph [Section III.C], paragraph [Section IV.A], paragraph [Section IV.B].

* cited by examiner

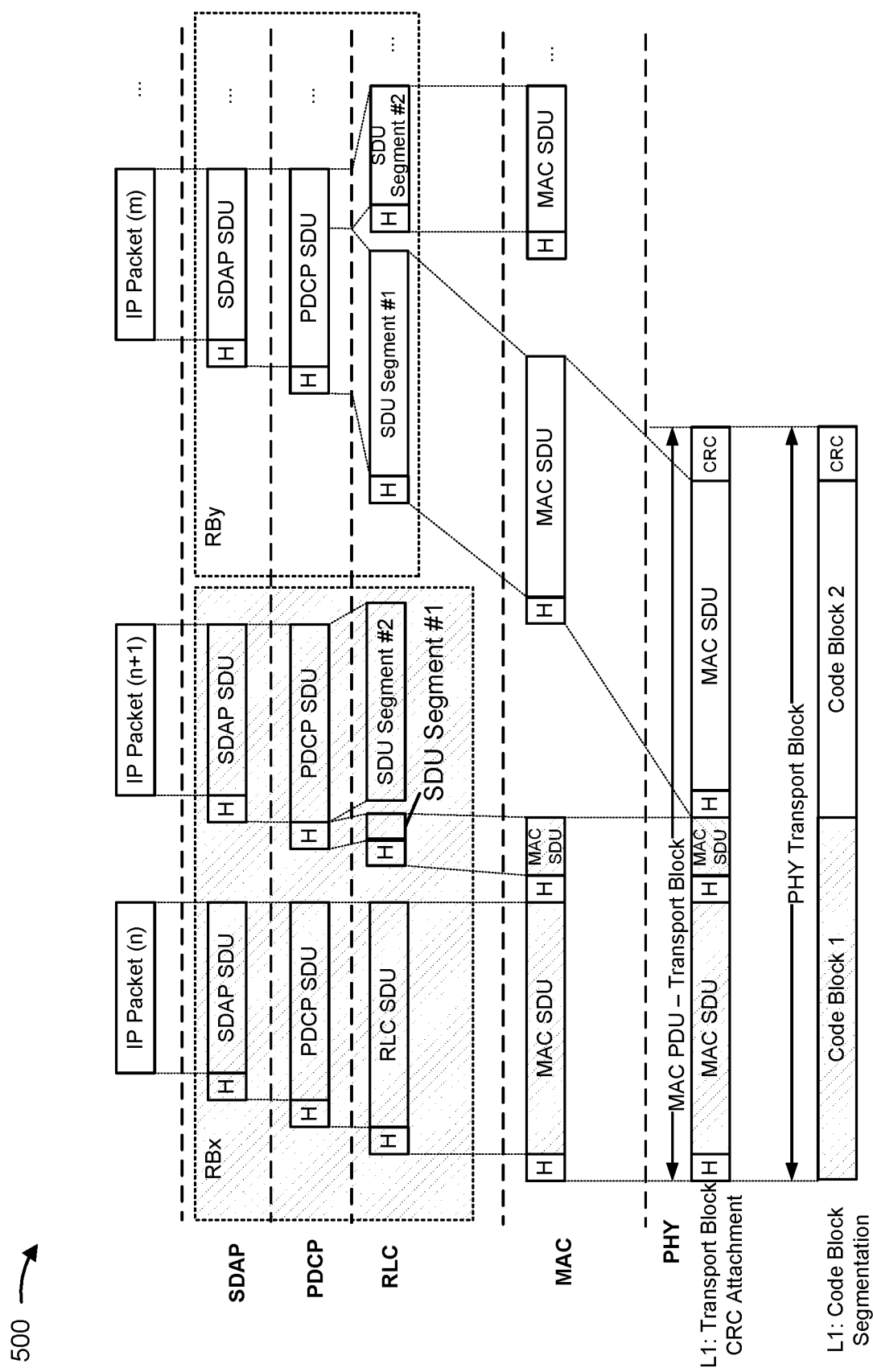

VIDEO AWARE TRANSMISSION AND MULTIPLE INPUT MULTIPLE OUTPUT LAYER PROCESSING

CROSS-REFERENCE TO RELATED APPLICATION

This patent application claims priority to U.S. Provisional Patent Application No. 63/007,717, filed on Apr. 9, 2020, entitled "VIDEO AWARE TRANSMISSION AND MULTIPLE INPUT MULTIPLE OUTPUT LAYER PROCESSING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for video aware transmission and multiple input multiple output (MIMO) layer processing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a communication device, may include classifying a set of packets of streaming video content based at least in part on one or more video characteristics, wherein the one or more video characteristics relate to an effect of a packet on a quality of experience of providing the streaming video content; assigning the set of packets to a plurality of transport blocks based at least in part on classifying the set of packets, wherein a first transport block, of the plurality of transport blocks, is associated with a first set of values for a set of communication parameters and a second transport block, of the plurality of transport blocks, is associated with a second set of values for the set of communication parameters, wherein the set of communication parameters associated with a layer mapping technique; and providing the plurality of transport blocks for transmission based at least in part on assigning the set of packets to the plurality of transport blocks.

In some aspects, a communication device for wireless communication may include memory and one or more processors operatively coupled to the memory. The memory and the one or more processors may be configured to classify a set of packets of streaming video content based at least in part on one or more video characteristics, wherein the one or more video characteristics relate to an effect of a packet on a quality of experience of providing the streaming video content; assign the set of packets to a plurality of transport blocks based at least in part on classifying the set of packets, wherein a first transport block, of the plurality of transport blocks, is associated with a first set of values for a set of communication parameters and a second transport block, of the plurality of transport blocks, is associated with a second set of values for the set of communication parameters, wherein the set of communication parameters associated with a layer mapping technique; and provide the plurality of transport blocks for transmission based at least in part on assigning the set of packets to the plurality of transport blocks.

In some aspects, a non-transitory computer-readable medium may store one or more instructions for wireless communication. The one or more instructions, when executed by one or more processors of a communication device, may cause the one or more processors to classify a set of packets of streaming video content based at least in part on one or more video characteristics, wherein the one or more video characteristics relate to an effect of a packet on a quality of experience of providing the streaming video content; assign the set of packets to a plurality of transport blocks based at least in part on classifying the set of packets, wherein a first transport block, of the plurality of transport blocks, is associated with a first set of values for a set of communication parameters and a second transport block, of the plurality of transport blocks, is associated with a second set of values for the set of communication parameters, wherein the set of communication parameters associated with a layer mapping technique; and provide the plurality of transport blocks for transmission based at least in part on assigning the set of packets to the plurality of transport blocks.

In some aspects, an apparatus for wireless communication may include means for classifying a set of packets of streaming video content based at least in part on one or more video characteristics, wherein the one or more video characteristics relate to an effect of a packet on a quality of experience of providing the streaming video content; means for assigning the set of packets to a plurality of transport blocks based at least in part on classifying the set of packets, wherein a first transport block, of the plurality of transport blocks, is associated with a first set of values for a set of communication parameters and a second transport block, of the plurality of transport blocks, is associated with a second set of values for the set of communication parameters, wherein the set of communication parameters associated with a layer mapping technique; and means for providing the plurality of transport blocks for transmission based at least in part on assigning the set of packets to the plurality of transport blocks.

In some aspects, a method of wireless communication, performed by a communication device, may include classifying a set of packets of streaming video content based at least in part on one or more video characteristics, wherein the one or more video characteristics relate to an effect of a packet on a quality of experience of providing the streaming video content; assigning the set of packets to a plurality of code blocks based at least in part on classifying the set of packets, wherein a first code block, of the plurality of code blocks, is associated with a first set of values for a set of communication parameters and a second code block, of the plurality of code blocks, is associated with a second set of values for the set of communication parameters, wherein the set of communication parameters associated with a layer mapping technique; and providing the plurality of code blocks for transmission based at least in part on assigning the set of packets to the plurality of code blocks.

In some aspects, a communication device for wireless communication may include memory and one or more processors operatively coupled to the memory. The memory and the one or more processors may be configured to classify a set of packets of streaming video content based at least in part on one or more video characteristics, wherein the one or more video characteristics relate to an effect of a packet on a quality of experience of providing the streaming video content; assign the set of packets to a plurality of code blocks based at least in part on classifying the set of packets, wherein a first code block, of the plurality of code blocks, is associated with a first set of values for a set of communication parameters and a second code block, of the plurality of code blocks, is associated with a second set of values for the set of communication parameters, wherein the set of communication parameters associated with a layer mapping technique; and provide the plurality of code blocks for transmission based at least in part on assigning the set of packets to the plurality of code blocks.

In some aspects, a non-transitory computer-readable medium may store one or more instructions for wireless communication. The one or more instructions, when executed by one or more processors of a communication device, may cause the one or more processors to classify a set of packets of streaming video content based at least in part on one or more video characteristics, wherein the one or more video characteristics relate to an effect of a packet on a quality of experience of providing the streaming video content; assign the set of packets to a plurality of code blocks based at least in part on classifying the set of packets, wherein a first code block, of the plurality of code blocks, is associated with a first set of values for a set of communication parameters and a second code block, of the plurality of code blocks, is associated with a second set of values for the set of communication parameters, wherein the set of communication parameters associated with a layer mapping technique; and provide the plurality of code blocks for transmission based at least in part on assigning the set of packets to the plurality of code blocks.

In some aspects, an apparatus for wireless communication may include means for classifying a set of packets of streaming video content based at least in part on one or more video characteristics, wherein the one or more video characteristics relate to an effect of a packet on a quality of experience of providing the streaming video content; means for assigning the set of packets to a plurality of code blocks based at least in part on classifying the set of packets, wherein a first code block, of the plurality of code blocks, is associated with a first set of values for a set of communication parameters and a second code block, of the plurality of code blocks, is associated with a second set of values for the set of communication parameters, wherein the set of communication parameters associated with a layer mapping technique; and means for providing the plurality of code blocks for transmission based at least in part on assigning the set of packets to the plurality of code blocks.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5B are diagrams illustrating examples associated with block production by a communication device to enable a BS to provide streaming video to a UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
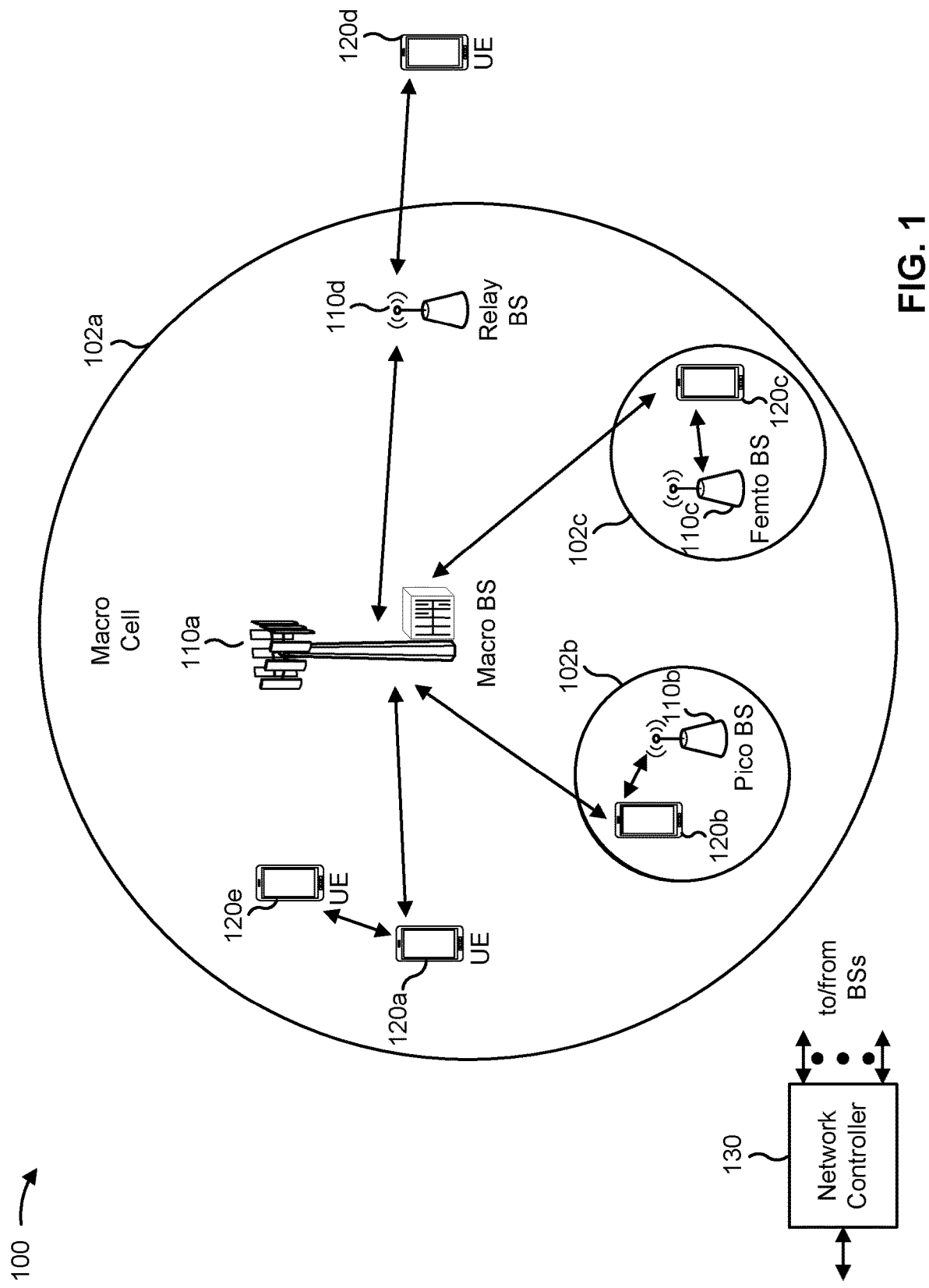
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
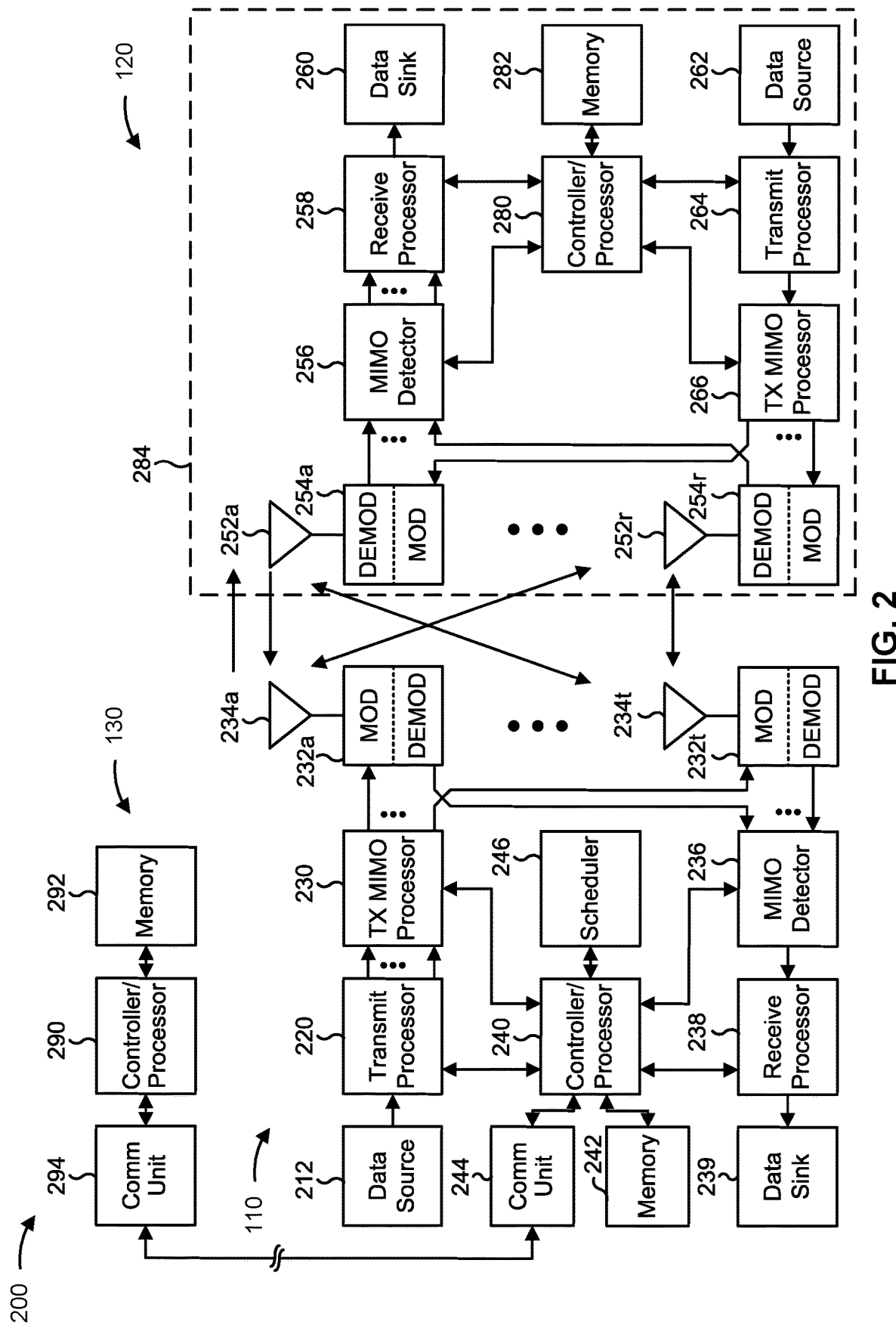
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-7.

Controller/processor 240 of base station 110, controller/processor 280 of UE 120, and/or any other component(s) of FIG. 2 may perform one or more techniques associated with video aware transmission and multiple input multiple output (MIMO) layer processing, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the communication device includes means for classifying a set of packets of streaming video content based at least in part on one or more video characteristics, wherein the one or more video characteristics relate to an effect of a packet on a quality of experience of providing the streaming video content; means for assigning the set of packets to a plurality of transport blocks based at least in part on classifying the set of packets, wherein a first transport block, of the plurality of transport blocks, is associated with a first set of values for a set of communication parameters and a second transport block, of the plurality of transport blocks, is associated with a second set of values for the set of communication parameters, and wherein the set of communication parameters associated with a layer mapping technique; or means for providing the plurality of transport blocks for transmission based at least in part on assigning the set of packets to the plurality of transport blocks. In some aspects, the means for the communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the communication device includes means for classifying the set of packets into a real-time transport protocol header category or at least one video component category.

In some aspects, the communication device includes means for assigning a first one or more packets to a first data stream with a first quality of service and a second one or more packets to a second data stream with a second quality of service.

In some aspects, the communication device includes means for providing the plurality of transport blocks via a plurality of data radio bearers.

In some aspects, the communication device includes means for mapping the plurality of transport blocks to a multiple input multiple output (MIMO) layer based at least in part on at least one of a MIMO layer signal to noise ratio, a transport block classification, or the quality of experience.

In some aspects, the communication device includes means for classifying a set of packets of streaming video content based at least in part on one or more video characteristics, wherein the one or more video characteristics relate to an effect of a packet on a quality of experience of providing the streaming video content; means for assigning the set of packets to a plurality of code blocks based at least in part on classifying the set of packets, wherein a first code block, of the plurality of code blocks, is associated with a first set of values for a set of communication parameters and a second code block, of the plurality of code blocks, is associated with a second set of values for the set of communication parameters, and wherein the set of communication parameters associated with a layer mapping technique; or means for providing the plurality of code blocks for transmission based at least in part on assigning the set of packets to the plurality of code blocks. In some aspects, the means for the communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the communication device includes means for identifying, at a media access control (MAC) layer, a code block size for a code block; or means for allocating a radio link control (RLC) block to the code block based at least in part on the code block size.

In some aspects, the communication device includes means for classifying a plurality of code blocks based at least in part on an effect of the plurality of code blocks on the quality of experience, wherein the code block is mapped to a multiple input multiple output (MIMO) layer based at least in part on at least one of a MIMO layer signal to noise ratio, a code block classification, or the quality of experience.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
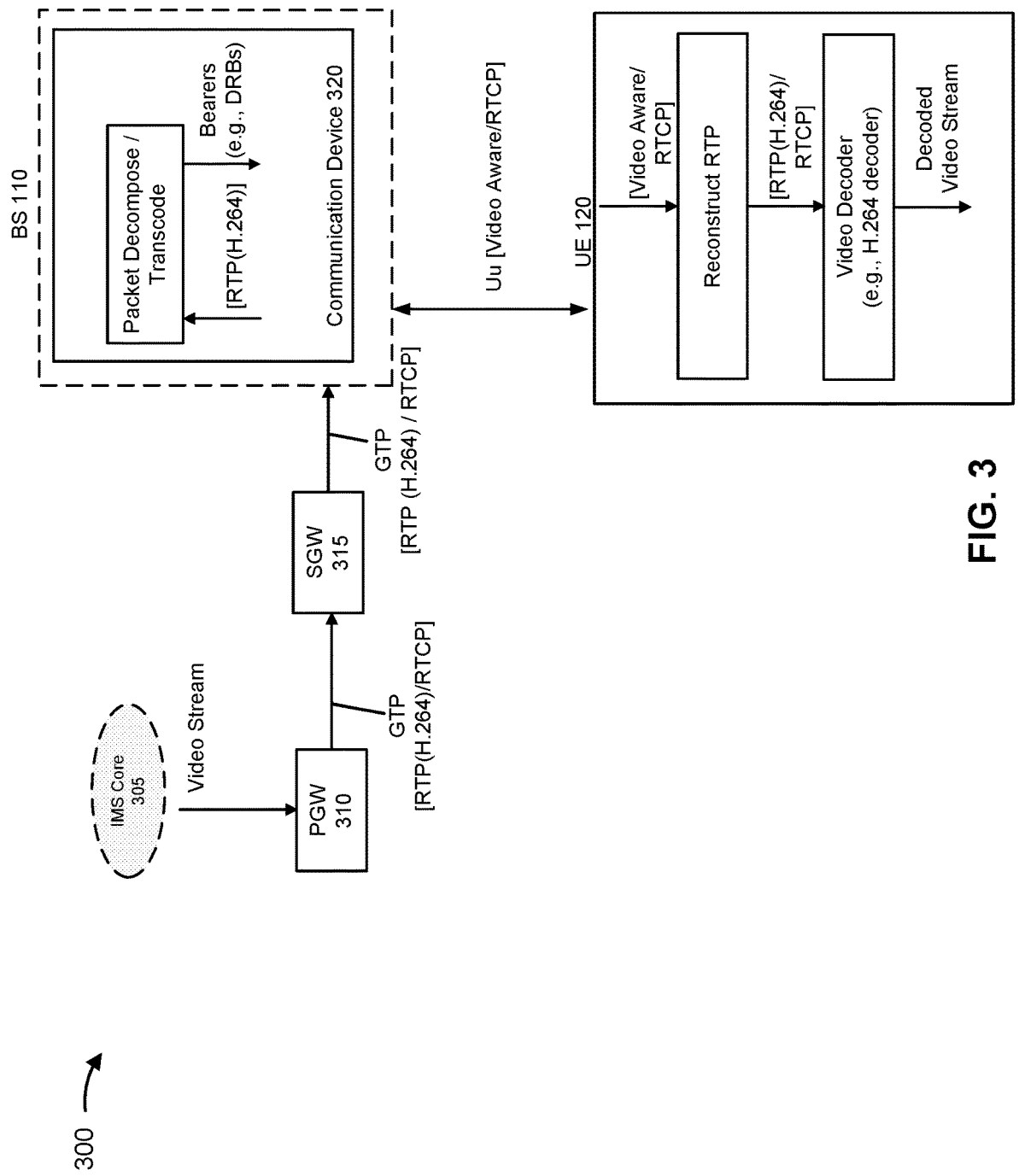
FIG. 3 is a diagram illustrating an example of a wireless communication network, in accordance with the present disclosure.

FIG. 3 is a block diagram conceptually illustrating an example of a wireless communication network 300 in which a BS (e.g., BS 110) provides streaming video to a UE (e.g., UE 120), in accordance with various aspects of the present disclosure. As shown in FIG. 3, wireless communication network 300 may include an Internet Protocol (IP) multimedia core network subsystem (IMS) core 305, a packet data network gateway (PGW) 310, a serving gateway (SGW) 315, a BS 110 (e.g., which may include a communication device 320), and a UE 120. As further shown in FIG. 3, BS 110 and UE 120 may communicate via an access link (e.g., a Uu interface).

PGW 310 includes one or more devices capable of providing connectivity for UE 120 to external packet data networks (e.g., via IMS core 305). For example, PGW 310 may include one or more data processing and/or traffic transfer devices, such as a gateway, a router, a modem, a switch, a firewall, a network interface card (NIC), a hub, a bridge, a server device, an optical add-drop multiplexer (OADM), or any other type of device that processes and/or transfers traffic. In some implementations, PGW 310 may aggregate traffic received from one or more SGWs 315, and may send the aggregated traffic to IMS core 305. Additionally, or alternatively, as described in more detail herein, PGW 310 may receive traffic from IMS core 305 and may send the traffic to UE 120 via SGW 315 and BS 110. For example, PGW 310 may receive a video stream from IMS core 305 that is to be provided to BS 110 for processing and transmission to UE 120 UE 120.

SGW 315 includes one or more devices capable of routing packets. For example, SGW 315 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, SGW 315 may aggregate traffic received from one or more BSs 110 associated with the wireless communication network 300 and may send the aggregated traffic to IMS core 305 (e.g., via PGW 310) and/or other network devices. SGW 315 may receive traffic from IMS core 305 (e.g., via PGW 310) and/or other network devices and may send the received traffic to BS 110 for processing and transmission to UE 120. For example, SGW 315 may receive real-time transport protocol (RTP) data and/or real time control transport protocol (RTCP) data with an RTP payload format H.264 (e.g., RTP data conveying the streaming video via general packet radio service (GPRS) tunneling protocol (GTP)). In this case, SGW 315 may provide the RTP data and/or RTCP data (e.g., the streaming video) to BS 110 via GTP and RTP and/or RTCP.

In some communications systems, such as Video Over 5G/NR (VoNR) or Video Over LTE (ViLTE), a BS and a UE may communicate using full duplex voice with either simplex or full duplex video streaming. The BS and UE may enable a relatively high level of synchronization between the voice and video streaming (which may be referred to, collectively, as streaming content), thereby enabling video-calling, streaming entertainment, and/or the like. The BS may activate dedicated bearers for transport of video and audio RTP traffic. The BS may assign different quality of service (QoS) levels for video (e.g., QoS class identifier (QCI) 2 for video) and audio (e.g., QCI 1 for audio), thereby providing some differentiation in reliability. For example, in this case, the BS prioritizes streaming audio, which may be delay and jitter sensitive, over streaming video, which may be less delay or jitter sensitive. In other words, during a video-conference use case, a brief interruption to audio from a speaker may be more disruptive to the video-conference than a brief interruption to video of the speaker.

However, at a medium access control (MAC) layer or physical (PHY) layer, the BS may perform procedures, such as scheduling, coding, modulation, multiplexing, orthogonal frequency division multiplexing (OFDM) symbol generation, and/or the like, agnostic of data that is being processed. In other words, the BS may process all data of a video stream without regard to what part of the video stream the data represents. As a result, interruptions to data transmission may result in excessively large effects to quality of experience (QoE) when the interruption affects a part of a video stream that has a large QoE effect.

Some aspects described herein provide video aware processing for streaming video. For example, as described below, a communication device (e.g., a BS or a component of a BS) may classify portions of streaming video based at least in part on an effect of each portion on QoE for the streaming video and may provide differential protection to portions based at least in part on the classification. In other words, the communication device may assign different portions of streaming video to different code blocks and/or transport blocks based at least in part on the classification. For example, the communication device may generate a first data stream for header data (e.g., RTP, user datagram protocol (UDP), IP header data) (a lack of which may have a first effect on QoE), a second data stream for transparent operation (a lack of which may have a second effect on QoE), a third data stream for a first QoS classification (a lack of which may have a third effect on QoE), a fourth data stream for a second QoS classification (a lack of which may have a fourth effect on QoE), and/or the like.

In this case, the communication device may provide differential protection to the different code blocks and/or transport blocks associated with different data streams by mapping the different code blocks and/or transport blocks (e.g., the data streams composed thereof) to different multiple input multiple output (MIMO) layers to provide differential reliability. In some aspects, each MIMO layer may have a different signal to noise ratio (SNR) and the communication device may assign different data streams to different MIMO layers based at least in part on the different SNRs to achieve differential reliability. In this way, the communication device ensures higher reliability for data associated with providing a high level of QoE relative to non-video-aware processing, thereby increasing QoE of streaming video. In other words, the communication device may provide relatively higher protection to code blocks and/or transport blocks conveying data from data streams with a higher effect on QoE and relatively lower protection to code blocks and/or transport blocks conveying data from data streams with a lower effect on QoE. In this way, the communication device ensures that data with a greatest effect on QoE (e.g., a greatest likelihood of interrupting consumption of the streaming video) is least likely to be dropped rather than all data having an approximately equal or randomly distributed likelihood of being dropped as may occur in non-video-aware processing. Although some aspects are described herein in terms of streaming video, other types of streaming content are contemplated.

Communication device 320 may include BS 110 or be a component of BS 110. For example, communication device 320 may be a video processing component that includes one or more of controller/processor 240, transmit processor 220, TX MIMO processor 230, MOD 232, antenna 234, and/or the like of BS 110. As shown in FIG. 3, BS 110 may decompose and/or transcode received packets (e.g., packets received from SGW 315) to identify underlying aspects of the data, such as different aspects of the streaming video (e.g., different video aspects, different audio aspects, and/or the like), as described in more detail herein. In this case, based on received RTP data (e.g., RTP H.264 payload data), communication device 320 may assign portions of the received data to different code blocks and/or transport blocks, map the different code blocks and/or transport blocks to different MIMO layers, and provide a set of data radio bearers (DRBs) based at least in part on the mapping. In this case, BS 110 may provide the video aware DRBs and RTCP output data over the Uu interface to UE 120.

UE 120 may receive the video aware DRBs and the RTCP output data via the Uu interface. UE 120 may reconstruct the underlying RTP data (e.g., the RTP H.264 payload data) and process the underlying RTP data using a video decoder (e.g., an RTP H.264 decoder) to obtain a decoded video stream.

As indicated above, FIG. 3 is provided as an example. Other examples may differ from what is described with respect to FIG. 3.

Figure 4A:
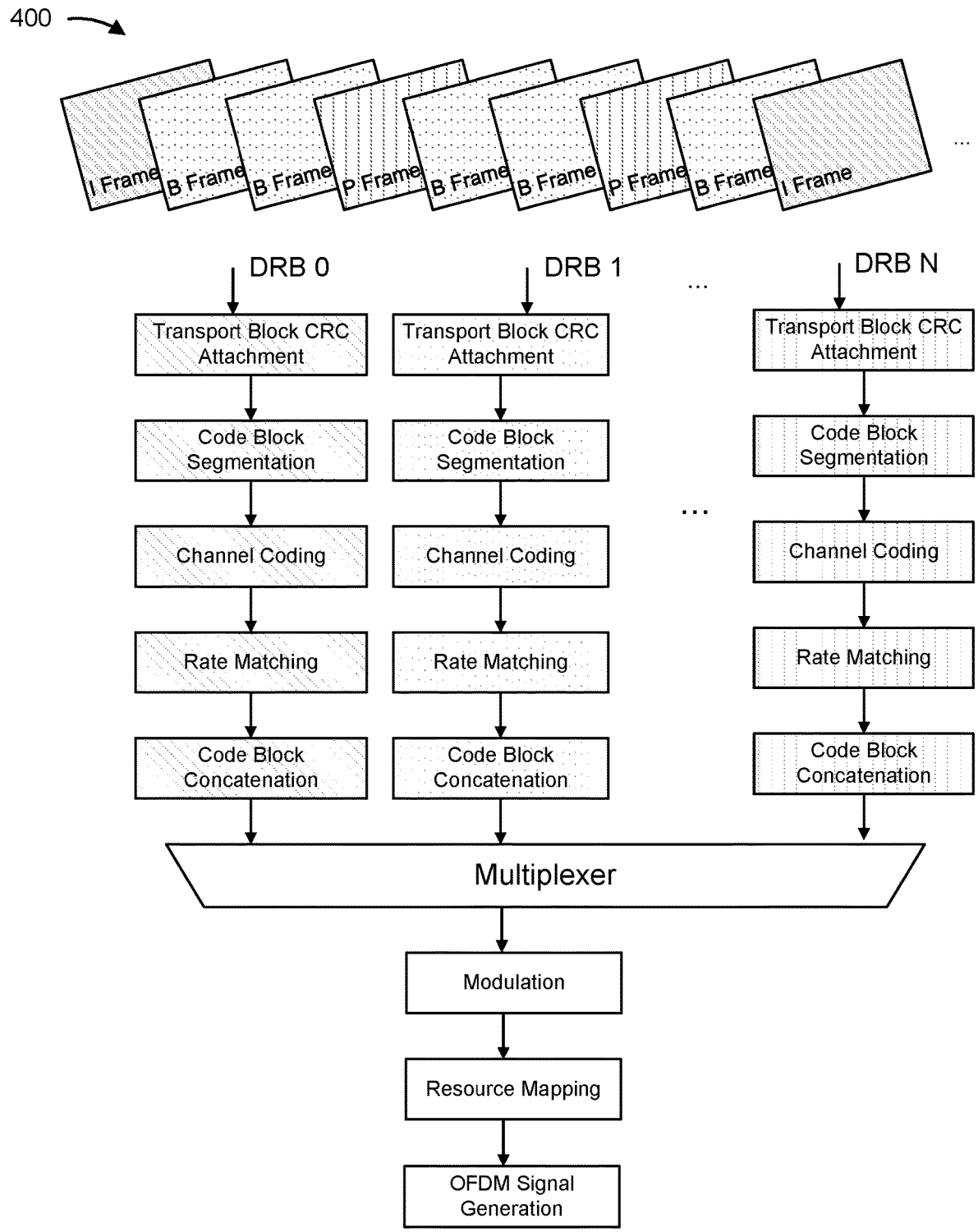
FIGS. 4A-4B are diagrams illustrating examples associated with data processing by a communication device to enable a BS to provide streaming video to a UE, in accordance with the present disclosure.
Figure 4B:
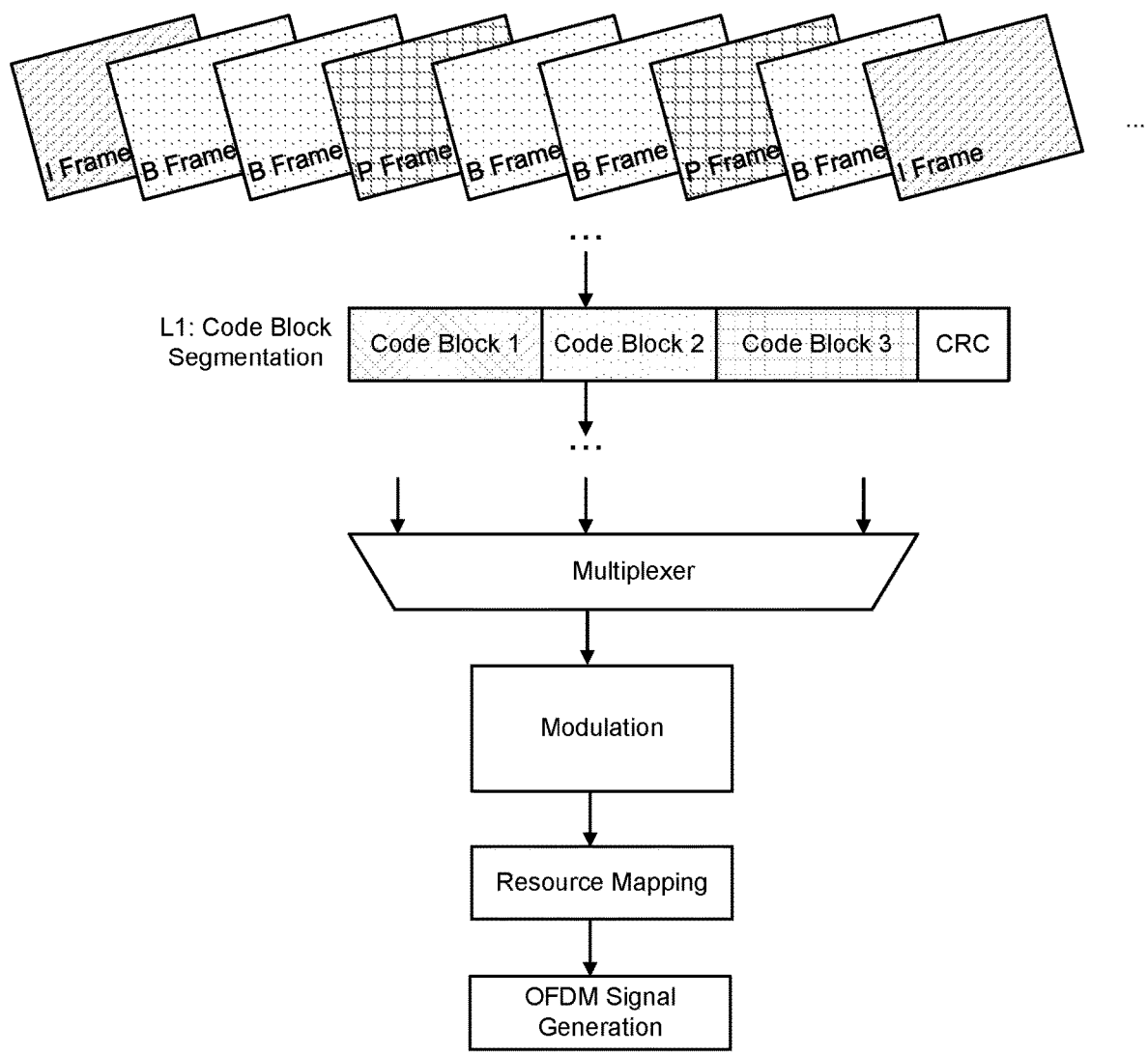

FIGS. 4A and 4B are diagrams illustrating examples 400/400' of data processing by a communication device to enable a BS to provide streaming video to a UE, in accordance with various aspects of the present disclosure.

As shown in FIG. 4A, a communication device (e.g., BS 110, communication device 320) may decompose streaming content (e.g., streaming video) into a plurality of portions associated with different characteristics to enable providing video aware DRBs. For example, the communication device may classify portions of the streaming content into an intra-code picture (I-frame) category (e.g., a frame which may include an entire image that is coded without reference to any other frame, but which may include references to portions of the frame itself), a predicted picture (P-frame) category (e.g., a frame which may include image data and motion vector displacements, and may reference previous frames in a decoding order), or a bidirectional predicted picture (B-frame) category (e.g., a frame which may include image data and/or motion vector displacements and may be decodable based at least in part on prior decoding of a subsequent frame that is to be displaced). These are simply examples of categories that may be used. In practice, the communication device may classify the streaming content according to one or more other types of heuristics. The communication device may assign different portions of the streaming content to different DRBs for processing (e.g., for transport block cyclic redundancy check (CRC) attachment, code block segmentation, channel coding, rate matching, code block concatenation, and/or the like, as described in more detail herein).

In some aspects, the communication device may map transport blocks to MIMO layers based at least in part on a classification of the streaming content. For example, based at least in part on classifying a first portion of the streaming content as having a relatively large effect on a quality of experience (QoE) (e.g., an absence of the first portion of the streaming content reduces a usability of the streaming content more than an absence of other portions, such as by preventing a playback device from playing any of the streaming content, which may affect QoE more than, for example, a second portion of the streaming content that is associated with maintaining exact synchronization between a video and audio of the streaming content, without which playback may still continue with, for example, poor synchronization), the communication device may map a DRB including transport blocks of the first portion of the streaming content to MIMO layers with higher signal to noise ratio (SNR) values (e.g., providing a greater level of reliability relative to other MIMO layers). In contrast, the communication device may map a DRB including a second portion of the streaming content that has a relatively low effect on QoE to a MIMO layer with a lower SNR value (e.g., providing a lower level of reliability relative to other MIMO layers). In this way, the communication device provides video aware processing of DRBs to enable greater quality of service (QoS) for DRBs with higher levels of effect on QoE, thereby providing greater QoE at a UE 120 that is to receive streaming content.

As further shown in FIG. 4A, based at least in part on processing the plurality of DRBs, the communication device may multiplex the plurality of DRBs, modulate a multiplexed stream, perform resource mapping, and perform orthogonal frequency division (OFDM) symbol generation to enable transmission of the plurality of DRBs with differential protection.

Similarly, as shown in FIG. 4B, the communication device may assign different classifications of the streaming content to different code blocks. For example, the communication device may assign I-frames to a first code block, P-frames to a second code block, B-frames to a third code block, and/or the like. Additionally, or alternatively, the communication device may classify portions of the streaming content based at least in part on other contemplated heuristics and assign different classifications to different code blocks of a physical layer transport block. In this case, the communication device may map the different code blocks to different MIMO layers based at least in part on an effect of content assigned to each code block on QoE of the streaming content and based at least in part on SNRs of the different MIMO layers. For example, the communication device may map a code block with high-QoE effect portions of the streaming content to a high SNR MIMO layer and a code block with low-QoE effect portions of the streaming content to a low SNR MIMO layer. In this way, the communication device enables video-aware processing to provide improved QoS to high-QoE code blocks, thereby providing higher QoE at a receiver device, such as UE 120.

As indicated above, FIGS. 4A and 4B is provided as examples. Other examples may differ from what is described with respect to FIGS. 4A and 4B.

Figure 5A:
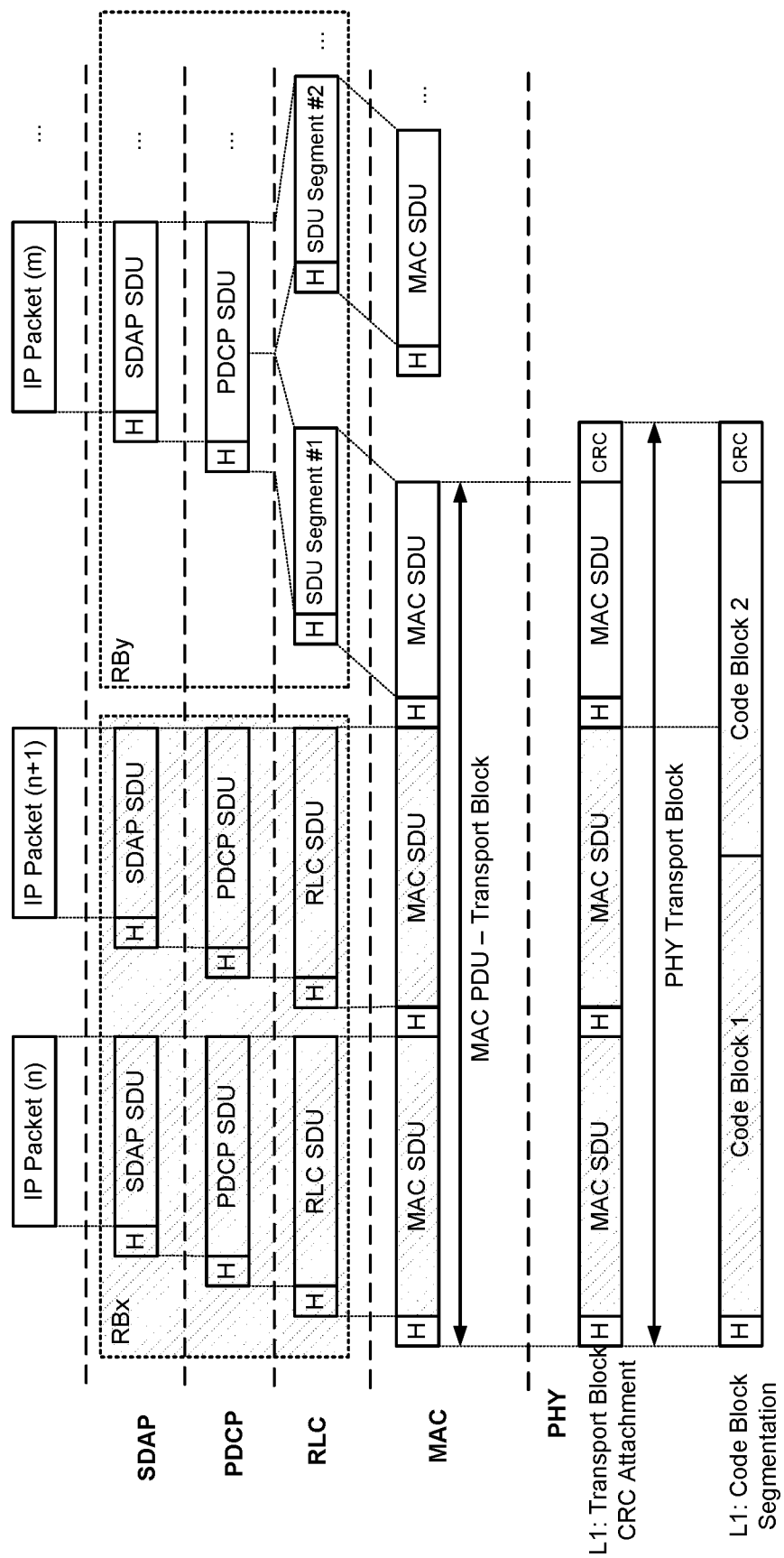

FIGS. 5A and 5B are diagrams illustrating examples 500/500' of block production by a communication device to enable a BS to provide streaming video to a UE, in accordance with various aspects of the present disclosure.

As shown in FIG. 5A, a medium access control (MAC) entity of a communication device may generate a transport block (e.g., based at least in part on service data adaptation protocol (SDAP) block generation, packet data convergence protocol (PDCP) block generation, and radio link control (RLC) block generation). For example, the MAC entity may concatenate two RLC protocol data units (PDUs) from a first radio bearer ($RB_x$) and one RLC PDU from a second radio bearer ($RB_y$). After concatenation, the communication device may add cyclic redundancy check (CRC) bits and divide a transport block into a plurality of code blocks. In this case, code block 2, for example, includes data of the first radio bearer and data of the second radio bearer. As a result, based at least in part on data from a plurality of DRBs being multiplexed into a common code block, the MAC entity provides the same QoS (e.g., the QoS of the common code block) for each radio bearer.

In contrast, as shown in FIG. 5B, a communication device (e.g., BS 110, communication device 320, and/or the like) may include a MAC entity that may determine a code block size. In this case, based at least in part on determining the code block size, the MAC entity of the communication device may allocate RLC PDUs to code block size units, such that different code blocks may be mapped to obtain different QoS, as described above. For example, as shown, the first code block includes only data from the first radio bearer and the second code block includes only data from the second radio bearer. In this case, the communication device may include padding bits to enable data of a radio bearer to fill an entire code block. In this way, based at least in part on ensuring that each radio bearer is in a separate code block from each other radio bearer, the communication device enables QoE based video-aware processing without changing a layer 1 (L1) block production procedure.

As indicated above, FIGS. 5A and 5B is provided as an example. Other examples may differ from what is described with respect to FIGS. 5A and 5B.

Figure 6:
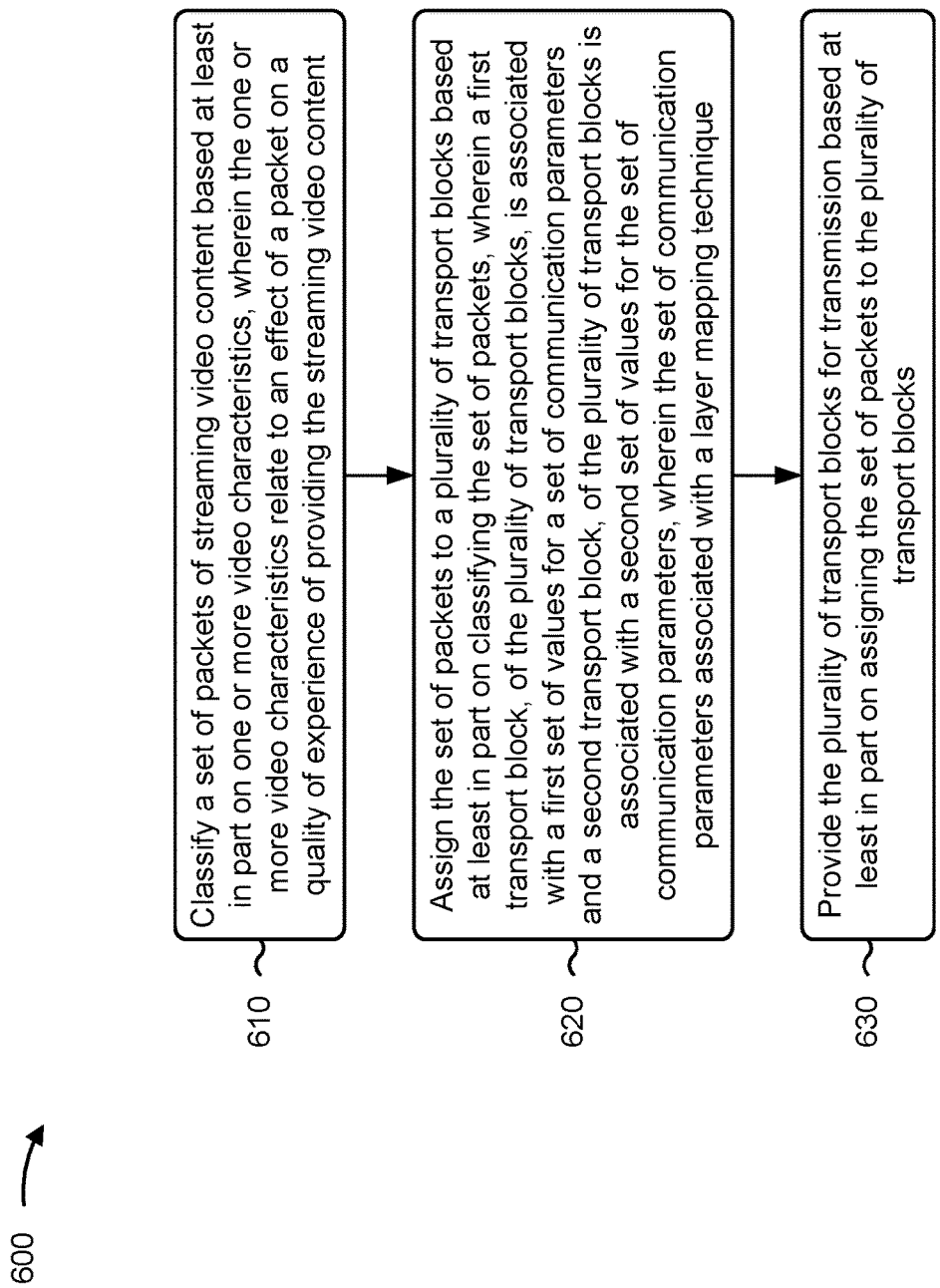
FIGS. 6-7 are diagrams illustrating example processes associated with video aware transmission and multiple input multiple output layer processing, in accordance with the present disclosure.

FIG. 6 is a diagram illustrating an example process 600 performed, for example, by a communication device, in accordance with various aspects of the present disclosure. Example process 600 is an example where the communication device (e.g., BS 110 and/or the like) performs operations associated with video aware transmission and MIMO layer processing.

As shown in FIG. 6, in some aspects, process 600 may include classifying a set of packets of streaming video content based at least in part on one or more video characteristics, wherein the one or more video characteristics relate to an effect of a packet on a quality of experience of providing the streaming video content (block 610). For example, the communication device (e.g., using controller/processor 240, transmit processor 220, TX MIMO processor 230, MOD 232, antenna 234, and/or the like) may classify a set of packets of streaming video content based at least in part on one or more video characteristics, as described above. In some aspects, the one or more video characteristics relate to an effect of a packet on a quality of experience of providing the streaming video content.

As further shown in FIG. 6, in some aspects, process 600 may include assigning the set of packets to a plurality of transport blocks based at least in part on classifying the set of packets, wherein a first transport block, of the plurality of transport blocks, is associated with a first set of values for a set of communication parameters and a second transport block, of the plurality of transport blocks is associated with a second set of values for the set of communication parameters, wherein the set of communication parameters associated with a layer mapping technique (block 620). For example, the communication device (e.g., using controller/processor 240, transmit processor 220, TX MIMO processor 230, MOD 232, antenna 234, and/or the like) may assign the set of packets to a plurality of transport blocks based at least in part on classifying the set of packets, as described above. In some aspects, a first transport block, of the plurality of transport blocks, is associated with a first set of values for a set of communication parameters and a second transport block, of the plurality of transport blocks is associated with a second set of values for the set of communication parameters. In some aspects, the set of communication parameters associated with a layer mapping technique.

As further shown in FIG. 6, in some aspects, process 600 may include providing the plurality of transport blocks for transmission based at least in part on assigning the set of packets to the plurality of transport blocks (block 630). For example, the communication device (e.g., using controller/processor 240, transmit processor 220, TX MIMO processor 230, MOD 232, antenna 234, and/or the like) may provide the plurality of transport blocks for transmission based at least in part on assigning the set of packets to the plurality of transport blocks, as described above.

Process 600 may include additional aspects, such as any single aspect or any combination of aspects described below and/or in connection with one or more other processes described elsewhere herein.

In a first aspect, the set of communication parameters includes a quality of service parameter.

In a second aspect, alone or in combination with the first aspect, classifying the set of packets includes classifying the set of packets into a real-time transport protocol header category or at least one video component category.

In a third aspect, alone or in combination with one or more of the first and second aspects, the at least one video component category includes at least one of: an intra-code picture (I-frame) category, a predicted picture (P-frame) category, or a bidirectional predicted picture (B-frame) category.

In a fourth aspect, alone or in combination with one or more of the first through third aspects, assigning the set of packets to the plurality of transport blocks includes assigning a first one or more packets to a first data stream with a first quality of service and a second one or more packets to a second data stream with a second quality of service.

In a fifth aspect, alone or in combination with one or more of the first through fourth aspects, providing the plurality of transport blocks includes providing the plurality of transport blocks via a plurality of data radio bearers.

In a sixth aspect, alone or in combination with one or more of the first through fifth aspects, providing the plurality of transport blocks includes mapping the plurality of transport blocks to a multiple input multiple output (MIMO) layer based at least in part on at least one of a MIMO layer signal to noise ratio, a transport block classification, or the quality of experience.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
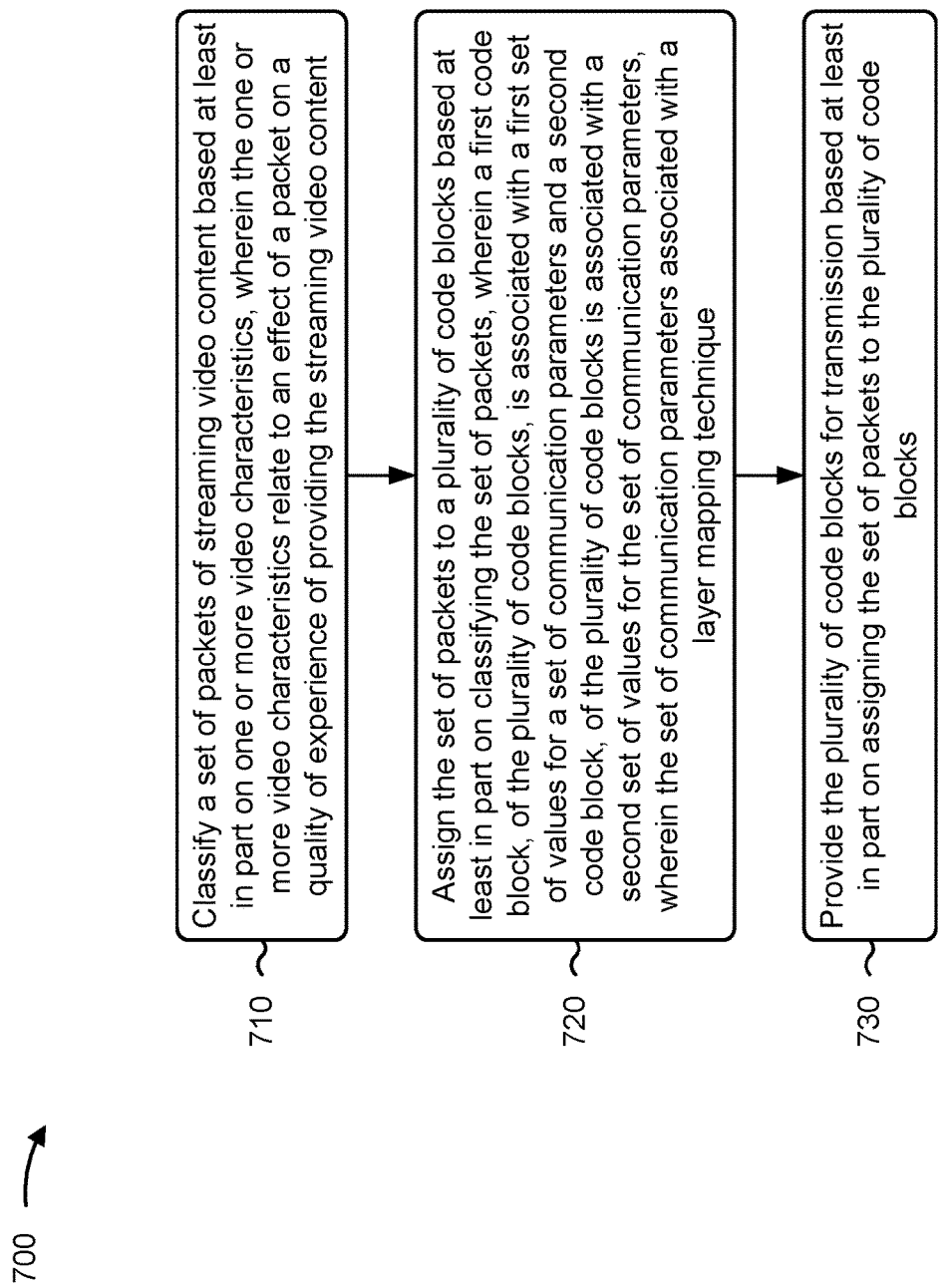

FIG. 7 is a diagram illustrating an example process 700 performed, for example, by a communication device, in accordance with various aspects of the present disclosure. Example process 700 is an example where the communication device (e.g., BS 110 and/or the like) performs operations associated with video aware transmission and MIMO layer processing.

As shown in FIG. 7, in some aspects, process 700 may include classifying a set of packets of streaming video content based at least in part on one or more video characteristics, wherein the one or more video characteristics relate to an effect of a packet on a quality of experience of providing the streaming video content (block 710). For example, the communication device (e.g., using controller/processor 240, transmit processor 220, TX MIMO processor 230, MOD 232, antenna 234, and/or the like) may classify a set of packets of streaming video content based at least in part on one or more video characteristics, wherein the one or more video characteristics relate to an effect of a packet on a quality of experience of providing the streaming video content, as described above. In some aspects, the one or more video characteristics relate to an effect of a packet on a quality of experience of providing the streaming video content.

As further shown in FIG. 7, in some aspects, process 700 may include assigning the set of packets to a plurality of code blocks based at least in part on classifying the set of packets, wherein a first code block, of the plurality of code blocks, is associated with a first set of values for a set of communication parameters and a second code block, of the plurality of code blocks is associated with a second set of values for the set of communication parameters, wherein the set of communication parameters associated with a layer mapping technique (block 720). For example, the communication device (e.g., using controller/processor 240, transmit processor 220, TX MIMO processor 230, MOD 232, antenna 234, and/or the like) may assigning the set of packets to a plurality of code blocks based at least in part on classifying the set of packets, as described above. In some aspects, a first code block, of the plurality of code blocks, is associated with a first set of values for a set of communication parameters and a second code block, of the plurality of code blocks is associated with a second set of values for the set of communication parameters. In some aspects, the set of communication parameters associated with a layer mapping technique.

As further shown in FIG. 7, in some aspects, process 700 may include providing the plurality of code blocks for transmission based at least in part on assigning the set of packets to the plurality of code blocks (block 730). For example, the communication device (e.g., using controller/processor 240, transmit processor 220, TX MIMO processor 230, MOD 232, antenna 234, and/or the like) may provide the plurality of code blocks for transmission based at least in part on assigning the set of packets to the plurality of code blocks, as described above.

Process 700 may include additional aspects, such as any single aspect or any combination of aspects described below and/or in connection with one or more other processes described elsewhere herein.

In a first aspect, providing the plurality of code block includes identifying, at a media access control (MAC) layer, a code block size for a code block; and allocating a radio link control (RLC) block to the code block based at least in part on the code block size.

In a second aspect, alone or in combination with the first aspect, the code block includes a single data radio bearer including one or more code blocks of the plurality of code blocks.

In a third aspect, alone or in combination with one or more of the first and second aspects, process 700 includes classifying a plurality of code blocks based at least in part on an effect of the plurality of code blocks on the quality of experience, wherein the code block is mapped to a multiple input multiple output (MIMO) layer based at least in part on at least one of a MIMO layer signal to noise ratio, a code block classification, or the quality of experience.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
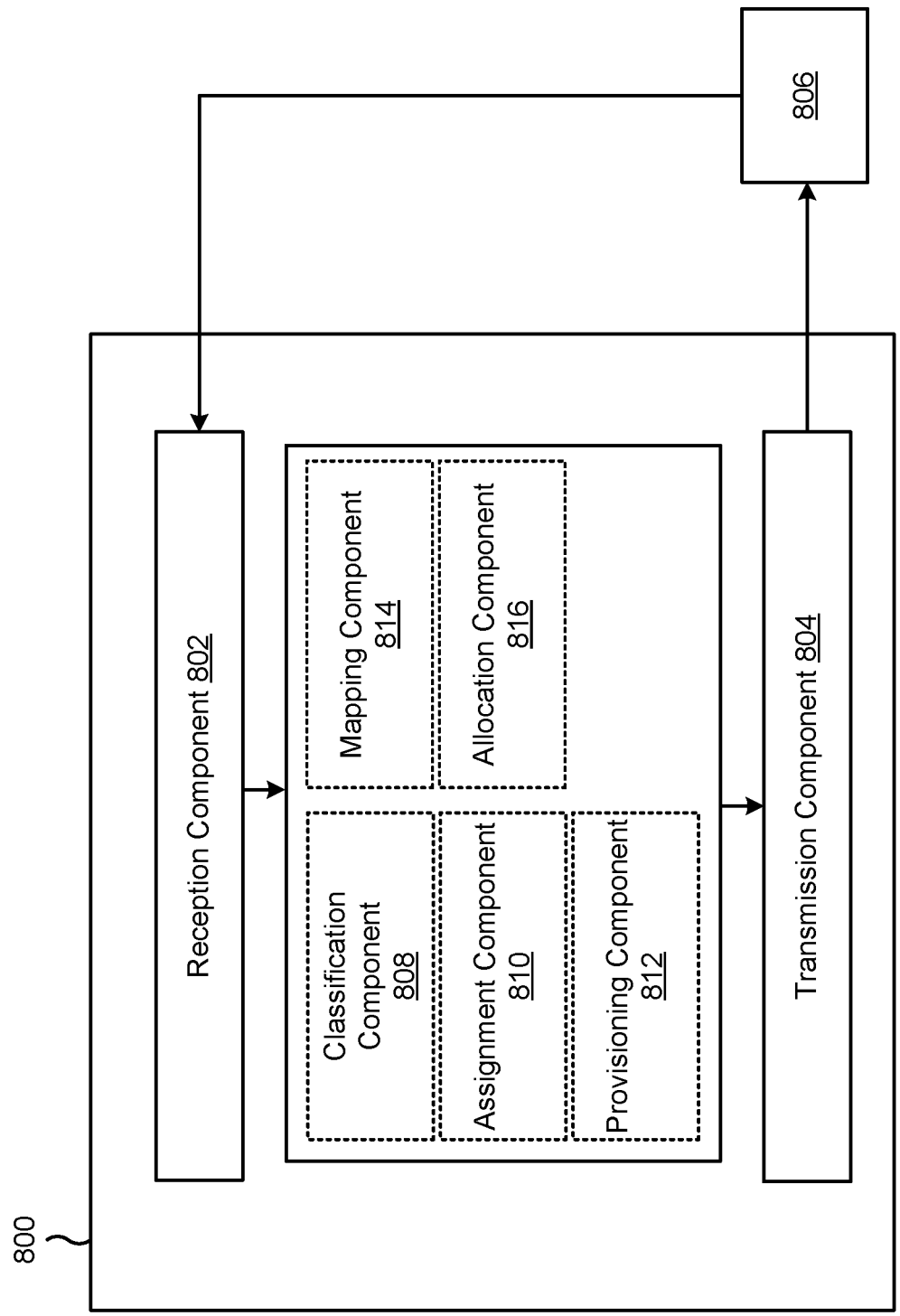
FIG. 8 is a block diagram of an example apparatus for wireless communication, in accordance with the present disclosure.

FIG. 8 is a block diagram of an example apparatus 800 for wireless communication. The apparatus 800 may be a communication device, or a communication device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a classification component 808, an assignment component 810, a provisioning component 812, a mapping component 814, or an allocation component 816, among other examples.

In some aspects, the apparatus 800 may be configured to perform one or more operations described herein in connection with FIGS. 3-5B. Additionally, or alternatively, the apparatus 800 may be configured to perform one or more processes described herein, such as process 600 of FIG. 6, process 700 of FIG. 7, or a combination thereof. In some aspects, the apparatus 800 and/or one or more components shown in FIG. 8 may include one or more components of the communication device described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the communication device described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the communication device described above in connection with FIG. 2. In some aspects, the transmission component 804 may be co-located with the reception component 802 in a transceiver.

The classification component 808 may classify a set of packets of streaming video content based at least in part on one or more video characteristics, wherein the one or more video characteristics relate to an effect of a packet on a quality of experience of providing the streaming video content. The assignment component 810 may assign the set of packets to a plurality of transport blocks based at least in part on classifying the set of packets, wherein a first transport block, of the plurality of transport blocks, is associated with a first set of values for a set of communication parameters and a second transport block, of the plurality of transport blocks, is associated with a second set of values for the set of communication parameters, and wherein the set of communication parameters associated with a layer mapping technique. The provisioning component 812 may provide (e.g., to the transmission component 804) the plurality of transport blocks for transmission based at least in part on assigning the set of packets to the plurality of transport blocks.

The classification component 808 may classify a set of packets of streaming video content based at least in part on one or more video characteristics, wherein the one or more video characteristics relate to an effect of a packet on a quality of experience of providing the streaming video content. The assignment component 810 may assign the set of packets to a plurality of code blocks based at least in part on classifying the set of packets, wherein a first code block, of the plurality of code blocks, is associated with a first set of values for a set of communication parameters and a second code block, of the plurality of code blocks, is associated with a second set of values for the set of communication parameters, and wherein the set of communication parameters associated with a layer mapping technique. The provisioning component 812 may provide (e.g., to the transmission component 804) the plurality of code blocks for transmission based at least in part on assigning the set of packets to the plurality of code blocks.

The classification component 808 may classify a plurality of code blocks based at least in part on an effect of the plurality of code blocks on the quality of experience, wherein the code block is mapped to a multiple input multiple output (MIMO) layer based at least in part on at least one of a MIMO layer signal to noise ratio, a code block classification, or the quality of experience.

The mapping component 814 may map the plurality of transport blocks to a MIMO layer based at least in part on a MIMO layer signal to noise ratio, a transport block classification, or a quality of experience. The provisioning component 812 may identify, at a MAC layer, a code block size for a code block and the allocation component 816 may allocate an RLC block to the code block based at least in part on the code block size.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a communication device, comprising: classifying a set of packets of streaming video content based at least in part on one or more video characteristics, wherein the one or more video characteristics relate to an effect of a packet on a quality of experience of providing the streaming video content; assigning the set of packets to a plurality of transport blocks based at least in part on classifying the set of packets, wherein a first transport block, of the plurality of transport blocks, is associated with a first set of values for a set of communication parameters and a second transport block, of the plurality of transport blocks, is associated with a second set of values for the set of communication parameters, and wherein the set of communication parameters associated with a layer mapping technique; and providing the plurality of transport blocks for transmission based at least in part on assigning the set of packets to the plurality of transport blocks.

Aspect 2: The method of Aspect 1, wherein the set of communication parameters includes a quality of service parameter.

Aspect 3: The method of any of Aspects 1 to 2, wherein classifying the set of packets comprises: classifying the set of packets into a real-time transport protocol header category or at least one video component category.

Aspect 4: The method of Aspect 3, wherein the at least one video component category includes at least one of: an intra-code picture (I-frame) category, a predicted picture (P-frame) category, or a bidirectional predicted picture (B-frame) category.

Aspect 5: The method of any of Aspects 1 to 4, wherein assigning the set of packets to the plurality of transport blocks comprises: assigning a first one or more packets to a first data stream with a first quality of service and a second one or more packets to a second data stream with a second quality of service.

Aspect 6: The method of any of Aspects 1 to 5, wherein providing the plurality of transport blocks comprises: providing the plurality of transport blocks via a plurality of data radio bearers.

Aspect 7: The method of any of Aspects 1 to 6, wherein providing the plurality of transport blocks comprises: mapping the plurality of transport blocks to a multiple input multiple output (MIMO) layer based at least in part on at least one of a MIMO layer signal to noise ratio, a transport block classification, or the quality of experience.

Aspect 8: A method of wireless communication performed by a communication device, comprising: classifying a set of packets of streaming video content based at least in part on one or more video characteristics, wherein the one or more video characteristics relate to an effect of a packet on a quality of experience of providing the streaming video content; assigning the set of packets to a plurality of code blocks based at least in part on classifying the set of packets, wherein a first code block, of the plurality of code blocks, is associated with a first set of values for a set of communication parameters and a second code block, of the plurality of code blocks, is associated with a second set of values for the set of communication parameters, and wherein the set of communication parameters associated with a layer mapping technique; and providing the plurality of code blocks for transmission based at least in part on assigning the set of packets to the plurality of code blocks.

Aspect 9: The method of Aspect 8, wherein providing the plurality of code blocks comprises: identifying, at a media access control (MAC) layer, a code block size for a code block; and allocating a radio link control (RLC) block to the code block based at least in part on the code block size.

Aspect 10: The method of Aspect 9, wherein the code block includes a single data radio bearer including one or more code blocks of the plurality of code blocks.

Aspect 11: The method of any of Aspects 9 to 10, further comprising: classifying a plurality of code blocks based at least in part on an effect of the plurality of code blocks on the quality of experience, wherein the code block is mapped to a multiple input multiple output (MIMO) layer based at least in part on at least one of a MIMO layer signal to noise ratio, a code block classification, or the quality of experience.

Aspect 12: An apparatus for wireless communication at a device, comprising a processor; memory coupled with the processor; and instructions stored in the memory and executable by the processor to cause the apparatus to perform the method of one or more Aspects of Aspects 1-7.

Aspect 13: A device for wireless communication, comprising a memory and one or more processors coupled to the memory, the memory and the one or more processors configured to perform the method of one or more Aspects of Aspects 1-7.

Aspect 14: An apparatus for wireless communication, comprising at least one means for performing the method of one or more Aspects of Aspects 1-7.

Aspect 15: A non-transitory computer-readable medium storing code for wireless communication, the code comprising instructions executable by a processor to perform the method of one or more Aspects of Aspects 1-7.

Aspect 16: A non-transitory computer-readable medium storing a set of instructions for wireless communication, the set of instructions comprising one or more instructions that, when executed by one or more processors of a device, cause the device to perform the method of one or more Aspects of Aspects 1-7.

Aspect 17: An apparatus for wireless communication at a device, comprising a processor; memory coupled with the processor; and instructions stored in the memory and executable by the processor to cause the apparatus to perform the method of one or more Aspects of Aspects 8-11.

Aspect 18: A device for wireless communication, comprising a memory and one or more processors coupled to the memory, the memory and the one or more processors configured to perform the method of one or more Aspects of Aspects 8-11.

Aspect 19: An apparatus for wireless communication, comprising at least one means for performing the method of one or more Aspects of Aspects 8-11.

Aspect 20: A non-transitory computer-readable medium storing code for wireless communication, the code comprising instructions executable by a processor to perform the method of one or more Aspects of Aspects 8-11.

Aspect 21: A non-transitory computer-readable medium storing a set of instructions for wireless communication, the set of instructions comprising one or more instructions that, when executed by one or more processors of a device, cause the device to perform the method of one or more Aspects of Aspects 8-11.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a communication device, comprising:
classifying a set of packets of streaming video content based at least in part on one or more video characteristics, wherein the one or more video characteristics relate to an effect of a packet on a quality of experience of providing the streaming video content, and wherein a first sub-set of packets, of the set of packets, is classified into a first classification based at least in part on an effect of the first sub-set of packets on the quality of experience of providing the streaming video content and a second sub-set of packets, of the set of packets, is classified into a second classification based at least in part on an effect of the second sub-set of packets on the quality of experience of providing the streaming video content being less than the effect of the first sub-set of packets on the quality of experience of providing the streaming video content;
assigning the set of packets to a plurality of transport blocks based at least in part on classifying the set of packets, wherein the first sub-set of packets is assigned to a first transport block, of the plurality of transport blocks, that is associated with a first set of values for a set of communication parameters based at least in part on the first sub-set of packets being classified into the first classification and the second sub-set of packets is assigned to a second transport block, of the plurality of transport blocks, that is associated with a second set of values for the set of communication parameters based at least in part on the second sub-set of packets being classified into the second classification, wherein the set of communication parameters are associated with a layer mapping technique, and wherein the layer mapping technique maps the first transport block to a first multiple input multiple output (MIMO) layer based at least in part on the first transport block being associated with the first set of values and maps the second transport block to a second MIMO layer based at least in part on the second transport block being associated with the second set of values; and providing the plurality of transport blocks for transmission based at least in part on assigning the set of packets to the plurality of transport blocks.

2. The method of claim 1, wherein the set of communication parameters includes a quality of service parameter.

3. The method of claim 1, wherein
the first classification comprises a real-time transport protocol header category or at least one video component category.

4. The method of claim 3, wherein the at least one video component category includes at least one of: an intra-code picture (I-frame) category, a predicted picture (P-frame) category, or a bidirectional predicted picture (B-frame) category.

5. The method of claim 1, wherein assigning the set of packets to the plurality of transport blocks comprises:
assigning the first sub-set of packets to a first data stream with a first quality of service and the second sub-set of packets to a second data stream with a second quality of service.

6. The method of claim 1, wherein providing the plurality of transport blocks comprises:
providing the plurality of transport blocks via a plurality of data radio bearers.

7. The method of claim 1, wherein providing the plurality of transport blocks comprises:
mapping the first transport block to the first MIMO layer based at least in part on at least one of a MIMO layer signal to noise ratio, a transport block classification, or the quality of experience.

8. A method of wireless communication performed by a communication device, comprising:
classifying a set of packets of streaming video content based at least in part on one or more video characteristics, wherein the one or more video characteristics relate to an effect of a packet on a quality of experience of providing the streaming video content;
assigning the set of packets to a plurality of code blocks based at least in part on classifying the set of packets, wherein a first code block, of the plurality of code blocks, is associated with a first set of values for a set of communication parameters and a second code block, of the plurality of code blocks, is associated with a second set of values for the set of communication parameters, and wherein the set of communication parameters associated with a layer mapping technique; and
providing the plurality of code blocks for transmission based at least in part on assigning the set of packets to the plurality of code blocks, wherein a code block size for a code block is determined at a media access control (MAC) layer, and wherein radio link control (RLC) blocks are allocated to the plurality of code blocks based at least in part on the code block size.

9. The method of claim 8, wherein the code block includes a single data radio bearer including one or more code blocks of the plurality of code blocks.

10. The method of claim 8, further comprising:
classifying a plurality of code blocks based at least in part on an effect of the plurality of code blocks on the quality of experience, wherein the code block is mapped to a multiple input multiple output (MIMO) layer based at least in part on at least one of a MIMO layer signal to noise ratio, a code block classification, or the quality of experience.

11. A communication device for wireless communication, comprising:

a memory; and
one or more processors, coupled to the memory, configured to:
classify a set of packets of streaming video content based at least in part on one or more video characteristics, wherein the one or more video characteristics relate to an effect of a packet on a quality of experience of providing the streaming video content, and wherein a first sub-set of packets, of the set of packets, is classified into a first classification based at least in part on an effect of the first sub-set of packets on the quality of experience of providing the streaming video content and a second sub-set of packets, of the set of packets, is classified into a second classification based at least in part on an effect of the second sub-set of packets on the quality of experience of providing the streaming video content being less than the effect of the first sub-set of packets on the quality of experience of providing the streaming video content;
assign the set of packets to a plurality of transport blocks based at least in part on classifying the set of packets, wherein the first sub-set of packets is assigned to a first transport block, of the plurality of transport blocks, that is associated with a first set of values for a set of communication parameters based at least in part on the first sub-set of packets being classified into the first classification and the second sub-set of packets is assigned to a second transport block, of the plurality of transport blocks, that is associated with a second set of values for the set of communication parameters based at least in part on the second sub-set of packets being classified into the second classification, wherein the set of communication parameters are associated with a layer mapping technique, and wherein the layer mapping technique maps the first transport block to a first multiple input multiple output (MIMO) layer based at least in part on the first transport block being associated with the first set of values and maps the second transport block to a second MIMO layer based at least in part on the second transport block being associated with the second set of values; and
provide the plurality of transport blocks for transmission based at least in part on assigning the set of packets to the plurality of transport blocks.

12. The communication device of claim 11, wherein the set of communication parameters includes a quality of service parameter.

13. The communication device of claim 11, wherein
the first classification comprises a real-time transport protocol header category or at least one video component category.

14. The communication device of claim 13, wherein the at least one video component category includes at least one of: an intra-code picture (I-frame) category, a predicted picture (P-frame) category, or a bidirectional predicted picture (B-frame) category.

15. The communication device of claim 11, wherein the one or more processors, to assign the set of packets to the plurality of transport blocks, are configured to:
assign the first sub-set of packets to a first data stream with a first quality of service and the second sub-set of packets to a second data stream with a second quality of service.

16. The communication device of claim 11, wherein the one or more processors, to provide the plurality of transport blocks, are configured to:
provide the plurality of transport blocks via a plurality of data radio bearers.

17. The communication device of claim 11, wherein the one or more processors, to provide the plurality of transport blocks, are configured to:
map the first transport block to the first MIMO layer based at least in part on at least one of a MIMO layer signal to noise ratio, a transport block classification, or the quality of experience.

18. A communication device for wireless communication, comprising:
a memory; and
one or more processors, coupled to the memory, configured to:
classify a set of packets of streaming video content based at least in part on one or more video characteristics, wherein the one or more video characteristics relate to an effect of a packet on a quality of experience of providing the streaming video content;
assign the set of packets to a plurality of code blocks based at least in part on classifying the set of packets, wherein a first code block, of the plurality of code blocks, is associated with a first set of values for a set of communication parameters and a second code block, of the plurality of code blocks, is associated with a second set of values for the set of communication parameters, and wherein the set of communication parameters associated with a layer mapping technique; and
provide the plurality of code blocks for transmission based at least in part on assigning the set of packets to the plurality of code blocks, wherein a code block size for a code block is determined at a media access control (MAC) layer, and wherein radio link control (RLC) blocks are allocated to the plurality of code blocks based at least in part on the code block size.

19. The communication device of claim 18, wherein the code block includes a single data radio bearer including one or more code blocks of the plurality of code blocks.

20. The communication device of claim 18, wherein the one or more processors are further configured to:
classify a plurality of code blocks based at least in part on an effect of the plurality of code blocks on the quality of experience, wherein the code block is mapped to a multiple input multiple output (MIMO) layer based at least in part on at least one of a MIMO layer signal to noise ratio, a code block classification, or the quality of experience.

21. The method of claim 8, wherein a first sub-set of packets, of the set of packets, is classified into a first classification based at least in part on an effect of the first sub-set of packets on the quality of experience of providing the streaming video content and a second sub-set of packets, of the set of packets is classified into a second classification based at least in part on an effect of the second sub-set of packets on the quality of experience of providing the streaming video content being less than the effect of the first sub-set of packets on the quality of experience of providing the streaming video content.

22. The communication device of claim 18, wherein a first sub-set of packets, of the set of packets, is classified into a first classification based at least in part on an effect of the first sub-set of packets on the quality of experience of providing the streaming video content and a second sub-set of packets, of the set of packets is classified into a second classification based at least in part on an effect of the second sub-set of packets on the quality of experience of providing the streaming video content being less than the effect of the first sub-set of packets on the quality of experience of providing the streaming video content.

* * * * *